United States Patent
Park et al.

(10) Patent No.: US 9,088,045 B2
(45) Date of Patent: Jul. 21, 2015

(54) SILICON-BASED NEGATIVE ACTIVE MATERIAL, PREPARING METHOD OF PREPARING SAME AND RECHARGEABLE LITHIUM BATTERY INCLUDING SAME

(71) Applicant: SAMSUNG SDI CO., LTD., Yongin-si, Gyeonggi-do (KR)

(72) Inventors: Sang-Eun Park, Yongin-si (KR); Young-Ugk Kim, Yongin-si (KR); Young-Hwan Kim, Yongin-si (KR); Sang-Min Lee, Yongin-si (KR); Duck-Chul Hwang, Yongin-si (KR); Young-Jun Lee, Yongin-si (KR); Young-Min Kim, Yongin-si (KR); Tae-Geun Kim, Yongin-si (KR); Seung-Ho Na, Yongin-si (KR); Ung-Kuk Heo, Yongin-si (KR); Deuk-Hwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 178 days.

(21) Appl. No.: 13/802,628

(22) Filed: Mar. 13, 2013

(65) Prior Publication Data
US 2014/0057176 A1 Feb. 27, 2014

(30) Foreign Application Priority Data

Aug. 23, 2012 (KR) .......................... 10-2012-0092564

(51) Int. Cl.
*H01M 4/485* (2010.01)
*H01M 4/36* (2006.01)
*H01M 4/04* (2006.01)
(Continued)

(52) U.S. Cl.
CPC .............. *H01M 4/366* (2013.01); *H01M 4/049* (2013.01); *H01M 4/131* (2013.01); *H01M 4/1391* (2013.01); *H01M 4/364* (2013.01); *H01M 4/485* (2013.01); *H01M 4/625* (2013.01); *Y02E 60/122* (2013.01)

(58) Field of Classification Search
None
See application file for complete search history.

(56) References Cited

U.S. PATENT DOCUMENTS

| 7,803,340 B2 | 9/2010 | Nozaki et al. |
| 7,919,205 B2 * | 4/2011 | Kogetsu et al. ............... 429/128 |

(Continued)

FOREIGN PATENT DOCUMENTS

| JP | 2002-042809 | 2/2002 |
| JP | 2006-89356 A | 4/2006 |

(Continued)

OTHER PUBLICATIONS

English Machine Translation of KR Patent No. 2002-042809 dated Feb. 8, 2002, 3 pages.

*Primary Examiner* — Cynthia K Walls
(74) *Attorney, Agent, or Firm* — Christie, Parker & Hale, LLP

(57) ABSTRACT

A silicon-based negative active material that includes a core including silicon oxide represented by $SiO_x$ ($0<x<2$); and a coating layer including metal oxide, and the metal of the metal oxide includes aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), and/or molybdenum (Mo), the core has a concentration gradient where an atom % concentration of a silicon (Si) element decreases to the center of the core, and an atom % concentration of an oxygen (O) element increases to the center, and a depth from the surface contacting the coating layer where a concentration of the silicon (Si) element is about 55 atom % corresponds to about 2% to about 20% of a diameter of the core.

17 Claims, 3 Drawing Sheets

(51) Int. Cl.
*H01M 4/131* (2010.01)
*H01M 4/1391* (2010.01)
*H01M 4/62* (2006.01)

(56) References Cited

U.S. PATENT DOCUMENTS

2008/0193831 A1  8/2008  Mah et al.
2010/0143804 A1  6/2010  Mah et al.
2012/0107693 A1* 5/2012  Ishida et al. ............... 429/231.8
2013/0230769 A1* 9/2013  Xu ............................... 429/199

FOREIGN PATENT DOCUMENTS

KR  10-2008-0076075    8/2008
KR  10-2008-0086121 A  9/2008
KR  10-2010-0066026    6/2010

* cited by examiner

SILICON-BASED NEGATIVE ACTIVE MATERIAL, PREPARING METHOD OF PREPARING SAME AND RECHARGEABLE LITHIUM BATTERY INCLUDING SAME

CROSS-REFERENCE TO RELATED APPLICATION

This application claims priority to and the benefit of Korean Patent Application No. 10-2012-0092564, filed in the Korean Intellectual Property Office on Aug. 23, 2012, the entire content of which is incorporated herein by reference.

BACKGROUND

1. Field

A silicon-based negative active material, a method of preparing the same, and a rechargeable lithium battery including the same are disclosed.

2. Description of the Related Art

A lithium rechargeable battery has recently drawn attention as a power source for a small portable electronic device. It uses an organic electrolyte solution and thereby can have at least twice the discharge voltage than that of a comparable battery using an alkali aqueous solution and as a result, has high energy density.

For positive active materials of a rechargeable lithium battery, lithium-transition element composite oxides being capable of intercalating lithium such as $LiCoO_2$, $LiMn_2O_4$, $LiNi_{1-x}Co_xO_2$ (0<x<1), and the like have been used.

As for negative active materials of a rechargeable lithium battery, various carbon-based materials such as artificial graphite, natural graphite, and hard carbon, which can all intercalate and deintercalate lithium ions, have been used. However, recently there has been research into non-carbon-based negative active materials such as Si for stability and high-capacity.

SUMMARY

An aspect of an embodiment of the present invention is directed toward a silicon-based negative active material that provides a high-capacity rechargeable lithium battery and improves cycle-life characteristics.

An aspect of an embodiment of the present invention is directed toward a method of preparing the silicon-based negative active material.

An aspect of an embodiment of the present invention is directed toward a rechargeable lithium battery including a silicon-based negative active material that provides a high-capacity rechargeable lithium battery and improves cycle-life characteristics.

According to one embodiment, provided is a silicon-based negative active material that includes a core including silicon oxide represented by $SiO_x$ (0<x<2); and a coating layer including metal oxide, wherein the metal of the metal oxide includes at least one selected from aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), and molybdenum (Mo). The core has a concentration gradient where an atom % concentration of a silicon (Si) element decreases according to increase of a depth from a surface contacting the coating layer to the center of the core, and an atom % concentration of an oxygen (O) element increases according to increase of the depth from the surface contacting the coating layer to the center of the core, and the depth from the surface contacting the coating layer where a concentration of the silicon (Si) element is about 55 atom % corresponds to about 2% to about 20% of a diameter of the core.

In the coating layer, in an integration of an atom % concentration of the silicon (Si) element according to the depth from the surface contacting the coating layer to the center of the core, an integral value of the atom % concentration of the silicon (Si) element from a depth of 0 to the depth where the concentration of the silicon (Si) element is about 55 atom % may range from about 5000 nm atom % to about 40000 nm atom %.

According to one embodiment, in the core, the depth from the surface contacting the coating layer where the concentration of the silicon (Si) element is about 55 atom % may be about 100 nm to about 1000 nm of the diameter of the core.

The core may include crystalline Si and non-crystalline silicon oxide.

The Si may be included in an amount of about 50 wt % to about 70 wt % based on 100 wt % of the core, and the amount of Si includes both the amount of Si in the crystalline Si and the amount of Si in the non-crystalline silicon oxide.

A concentration of the crystalline silicon (Si) may increase toward the surface contacting the coating layer.

The core may include $SiO_x$, where 0.5<x<1.5 and x indicates a content ratio of the silicon (Si) element to the oxygen (O) element.

The core may have an average particle diameter of about 0.1 μm to about 100 μm.

The silicon-based negative active material may have a specific surface area of about 10 $m^2/g$ to about 500 $m^2/g$.

A pore may be included in at least one part of the surface of contact between the core and coating layer.

The coating layer may have a thickness of about 5 nm to about 100 nm.

A weight ratio of the core to the coating layer may range from about 99.9:0.1 to about 95:5.

The metal oxide may be Ti oxide, and the Ti oxide may be $TiO_2$, $TiO_x$ (0<x<2), or a combination thereof.

The silicon-based negative active material may further include an outermost coating layer including a carbon-based material.

According to another embodiment, provided is a method of preparing a silicon-based negative active material that includes a silicon oxide particle represented by coating a silicon oxide particle represented by $SiO_x$ (0<x<2) with metal oxide to form a silicon oxide particle coated with a metal; and dipping the silicon oxide particle coated with the metal oxide in an etching solution to perform etching process.

The silicon oxide particle coated with the metal oxide may be further surface-treated with a carbon-based material to form an outermost coating layer after the etching process.

The etching solution may include an etchant selected from an acid, an F ion-containing compound, and a combination thereof.

According to another embodiment of the present invention, a rechargeable lithium battery includes a negative electrode including the silicon-based negative active material; a positive electrode including a positive active material being capable of intercalating and deintercalating lithium; and a non-aqueous electrolyte.

Here, the silicon-based negative active material according to an embodiment of the present invention may provide a rechargeable lithium battery with high-capacity and improved cycle-life characteristics.

DETAILED DESCRIPTION

Figure 1:
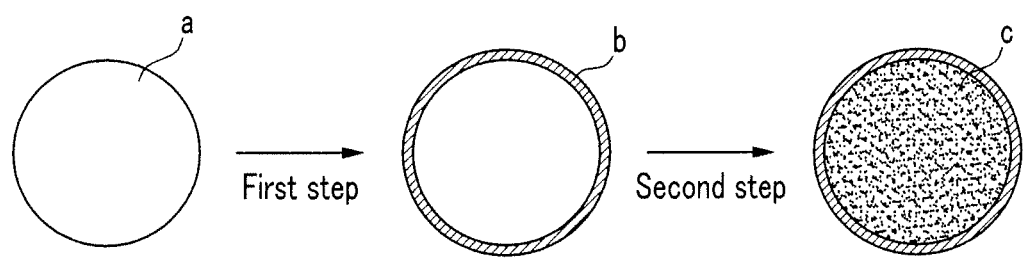
FIG. 1 is a schematic view schematically showing a silicon-based negative active material according to Examples of the present invention.

Exemplary embodiments of the present invention will hereinafter be described in more detail. However, these embodiments are only exemplary, and the present invention is not limited thereto.

One embodiment of the present invention provides a silicon-based negative active material including a core including silicon oxide represented by $SiO_x$ ($0<x<2$) and a coating layer including metal oxide. The metal of the metal oxide includes at least one selected from aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), and molybdenum (Mo). The core has a concentration gradient where an atom % concentration of a silicon (Si) element decreases, and an atom % concentration of oxygen (O) element increases according to increase of a depth from a surface contacting the coating layer to the center of the core. In the core, a depth from the surface contacting the coating layer where a concentration of the silicon (Si) element is about 55 atom % may be about 1/50 to about 1/5 of a diameter of the core. In the core, a sum of concentrations of the silicon (Si) element and oxygen (O) element may be 100 atom %.

The silicon-based negative active material may be etched to have the aforementioned concentration gradient. Since the coating layer may be formed of a porous material such as the metal oxide, the coating layer may permeate an etchant used in the etching process to the core, but not be etched.

Silicon oxide included in the core is etched to form pores in the core. The pores may work as a buffer during the volume expansion of silicon and thus, improve cycle-life characteristics of a rechargeable lithium battery including the silicon-based negative active material.

As described above, during the etching process, the metal coating layer is not etched, and only the silicon oxide core is etched, and thus, a pore is formed in the core and also, may be formed on the contact surface between the core and the coating layer. As a result, the silicon-based negative active material may include a pore in at least one part of the contact surface between the core and the coating layer.

The core may further include Si. For example, the core may be formed of silicon oxide including Si grains, that is, may include crystalline Si and non-crystalline silicon oxide. The Si may be included in an amount of about 50 wt % to about 70 wt % based on 100 wt % of the core, and the amount of Si includes both the amount of Si in the crystalline Si and the amount of Si in the non-crystalline silicon oxide. In one embodiment, when the Si is included within the range, high-capacity and excellent cycle-life characteristics of a lithium rechargeable battery are efficiently accomplished.

The silicon-based negative active material includes pores formed by etching silicon oxide ($SiO_x$) such as $SiO_2$, SiO, and the like but not the crystalline Si as aforementioned. Accordingly, the core formed by the etching may include relatively more Si. As a result, the silicon-based negative active material may realize a high-capacity electrode for a rechargeable lithium battery. For example, the $SiO_x$ may have $0.5<x<1.5$. Specifically, the silicon oxide particle may be $SiO_x$ having x in a range of about 0.6 to about 0.95. More specifically, the $SiO_x$ may have x ranging from about 0.7 to about 0.9 based on the entire particle. In one embodiment, when the silicon oxide particle includes a silicon (Si) element within the range, capacity and efficiency of a rechargeable lithium battery are appropriately improved.

In addition, the core formed by the etching is more etched toward the contact surface with the coating layer but less etched toward the center of the core. In other words, the core has high porosity toward the contact surface of the coating layer but low porosity toward the center of the core. Specifically, the core has a concentration gradient in which a silicon (Si) element has an increasing atom % concentration toward the contact surface of the coating layer but a decreasing atom % concentration toward the center of the core, while the oxygen (O) element has a decreasing atom % concentration toward the contact surface of the coating layer but an increasing atom % concentration toward the center of the core.

In one embodiment, the core has a concentration gradient where at a depth from the surface contacting the coating layer where a concentration of the silicon (Si) element is about 55 atom % corresponds to about 2% to about 20% of a diameter of the core. In another embodiment, the depth is about 6% to about 12% of the diameter of the core.

In one embodiment, in the core, in a graph showing or in an integration of an atom % concentration of the silicon (Si) element according to the depth from the surface contacting the coating layer to the center of the core, an integral value of an atom % concentration of the silicon (Si) element from the depth of 0 to the depth where the concentration of the silicon (Si) element is about 55 atom % may range from about 5000 nm atom % to about 40000 nm atom %. In another embodiment, the integral value is about 5000 nm atom % to about 38000 nm atom %.

Herein, an element concentration depending on the depth from the surface of the core contacting with the coating layer to the center of the core may be measured using, for example, XPS (X-ray photoelectron spectroscopy).

In one embodiment, in the core, the depth from the surface contacting the coating layer where a concentration of the silicon (Si) element is about 55 atom % is about 100 nm to about 1000 nm of the diameter of the core. In another embodiment, the depth is about 300 to about 600 nm.

Since silicon oxide (such as $SiO_2$ and the like) included in the core may hinder a reaction with lithium that deteriorates performance of a negative electrode, the silicon negative active material is prepared by decreasing the concentration of the silicon oxide toward the contact surface of the core with the coating layer and thereby improving reactivity with lithium and thus, may lower lithium reaction hindrance and improve electrochemical properties of a rechargeable lithium battery.

In this way, the silicon-based negative active material is silicon oxide-based and may still realize high-capacity and improved cycle-life characteristics of a rechargeable lithium battery.

The core may have an average particle diameter of about 0.1 μm to about 100 μm. In one embodiment, when the core has an average particle diameter within the range, a rechargeable lithium battery has excellent cycle-life and capacity characteristics.

The coating layer may have a thickness of about 5 nm to about 100 nm. In one embodiment, when the coating layer has a thickness within the range, a rechargeable lithium battery has excellent cycle-life and capacity characteristics.

The silicon-based negative active material may have a specific surface area of about 10 $m^2/g$ to about 500 $m^2/g$. Specifically, the silicon-based negative active material may have a specific surface area of about 10 $m^2/g$ to about 40 $m^2/g$. More specifically, the silicon-based negative active material may have a specific surface area of about 10 $m^2/g$ to about 30 $m^2/g$. In one embodiment, when the silicon-based negative active material has a specific surface area within the range, a rechargeable lithium battery has excellent cycle-life and capacity characteristics.

A weight ratio of the core to the coating layer may range from about 99.9:0.1 to about 95:5. In one embodiment, when the core and the coating layer are formed within the content ratio, a silicon-based negative active material prepared by using an etchant appropriately passing the coating layer during the etching and forming a concentration gradient in the core as aforementioned accomplishes excellent cycle-life and capacity characteristics of a rechargeable lithium battery.

The silicon-based negative active material may further include an outermost coating layer including a carbon-based material. The outermost coating layer including a carbon-based material may further improve initial efficiency and cycle-life characteristics of a rechargeable lithium battery.

The carbon-based material may be crystalline carbon or amorphous carbon. The crystalline carbon may be non-shaped, or sheet, flake, spherical, or fiber-shaped natural graphite or artificial graphite. The amorphous carbon may be a soft carbon, a hard carbon, a mesosphere pitch carbonized product, fired coke, and the like.

The carbon-based material may be used in an amount of less than or equal to about 50 wt % and specifically, in an amount of about 1 wt % to about 5 wt % for the surface treatment of the silicon-based negative active material. In one embodiment, when the silicon-based negative active material includes the carbon-based material within the range, a rechargeable lithium battery is prevented from extreme initial efficiency decrease.

When, in the silicon-based negative active material having a coating layer including a metal oxide, a metal is Ti, the metal oxide may be $TiO_2$. The $TiO_2$ may be partly transformed into $TiO_x$ (0<x<2, e.g. $Ti_2O_3$, $Ti_3O_5$, etc.) by a heat applied to form the outermost coating layer including a carbon-based material at the outermost of the silicon-based negative active material. Herein, the coating layer may include both $TiO_2$ and $TiO_x$ (0<x<2). The $TiO_2$ and $TiO_x$ (0<x<2) respectively has different porosity, the entire porosity of the silicon-based negative active material may be adjusted by controlling whether or not the carbon-based material is used to form the outermost coating layer, a temperature for heating the outermost coating layer formed of the carbon-based material, and/or the like.

In one embodiment, the silicon-based negative active material is formed by the following method.

According to one embodiment of the present invention, a method of preparing the silicon-based negative active material includes coating a silicon oxide particle represented by $SiO_x$ (0<x<2) with metal oxide to form a coating layer; and dipping the silicon oxide particle coated with the metal oxide in an etching solution to perform an etching process.

The metal of the metal oxide may be at least one selected from aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), and molybdenum (Mo).

The detailed description of the silicon-based negative active material prepared in the manufacturing method is the same as aforementioned.

The silicon oxide particle represented by $SiO_x$ (0<x<2) may be prepared by a suitable commercially available method. In addition, the silicon oxide particle including Si grains may be used as described above.

For example, SiO powder may be used, and the Si grains may be produced by heat-treating the SiO powder as described later.

The coating process of metal oxide may be mechanofusion, chemical vapor deposition (CVD), sputtering, precipitation, filtering, vacuum-drying, and/or the like, but the present invention is not limited thereto.

The silicon oxide particles coated with a metal oxide may be heat-treated in the air or under a reduction atmosphere. The heat treatment may be performed at a temperature ranging from about 400° C. to about 900° C. Herein, the silicon oxide particles may be additionally dried at a temperature ranging from about 100° C. to about 150° C. for about 2 hours to about 10 hours. After the drying, the silicon oxide particles may be immediately heat-treated and be slowly cooled down to room temperature and then, increased to be at a temperature ranging from about 400° C. to about 900° C. by heating. The heat treatment may be performed for about 8 hours to about 15 hours within the temperature range.

The reduction atmosphere is an atmosphere for reducing the silicon-based negative active material without any particular limit and may include a nitrogen ($N_2$) gas atmosphere, a hydrogen ($H_2$) gas atmosphere, argon (Ar), a vacuum atmosphere, and/or the like. In addition, the silicon oxide particles are mixed with Super P and/or the like as a carbon source and then, may be heat-treated together to produce a reduction atmosphere.

The silicon-based negative active material prepared in the aforementioned method is coated with a metal oxide and then, etched so that pulverization of the coating layer may be reduced or minimized due to the etching. The more the coating layer is pulverized, the larger surface area the negative active material has, forming a larger SEI film on the surface of a negative electrode and thereby increasing its non-reversibility. In addition, since the negative active material has less bonding with a current collector during preparation of slurry, the amount of the binder needed may increase and thus, decrease capacity. Accordingly, the silicon-based negative active material prepared by reducing or minimizing pulverization of the coating layer may accomplish stability and high-capacity of a rechargeable lithium battery. For example, the silicon-based negative active material may have a specific surface area ranging from about 10 $m^2/g$ to about 500 $m^2/g$ and specifically, about 10 $m^2/g$ to about 40 $m^2/g$. In one embodiment, when the silicon-based negative active material has a specific surface area within the range, a rechargeable lithium battery has excellent cycle-life and capacity characteristics.

For example, the method may provide a silicon-based negative active material having a specific surface area by minimizing pulverization and including silicon oxide ($SiO_x$) having 0.5<x<1.5. In one embodiment, when the silicon oxide particle includes a silicon (Si) element within the range, capacity and efficiency of a lithium rechargeable battery is appropriately improved.

The etching solution may include an etchant such as acid or an F ion-containing compound. In other words, the etchant may include any material used in a common etching solution without any particular limit but, for example, acid such as nitric acid, sulfuric acid, or the like and/or an F ion-containing compound such as HF, $NH_4F$, $NH_4HF_2$, or the like. According to one embodiment of the present invention, the F ion-containing compound may be used as an etchant for faster etching.

The etching solution may have an F ion concentration ranging from about 0.5M to about 12M or a solution of equivalent concentration having the same etching rate, and the silicon oxide particles coated with a metal oxide may be dipped into this etching solution for about 10 minutes to about 120 minutes and etched.

FIG. 1 is a schematic view showing a method of manufacturing a silicon-based negative active material according to an exemplary embodiment of the present invention. Referring to FIG. 1, a metal oxide coating layer (b) is formed on silicon oxide (a) [step 1], and the silicon oxide (a) having the metal oxide coating layer (b) is etched [step 2] to form an etched silicon oxide core (c).

After etching the silicon oxide particle coated with the metal oxide, the etched silicon oxide particle is further surface-treated with a carbon-based material to form an outermost coating layer.

The carbon-based material is the same as aforementioned, and the surface treatment may be performed in a common method without any particular limit. In particular, the surface treatment may include magnetron sputtering, electron beam deposition, IBAD (ion beam assisted deposition), CVD (chemical vapor deposition), sol-gel, and/or ionization of evaporated particles.

According to another embodiment of the present invention, a rechargeable lithium battery includes a negative electrode including the silicon-based negative active material; a positive electrode including a positive active material being capable of intercalating and deintercalating lithium; and a non-aqueous electrolyte.

A rechargeable lithium battery may be classified as a lithium ion battery, a lithium ion polymer battery, and a lithium polymer battery according to a separator and kinds of an electrolyte used therein. The rechargeable lithium battery may have a variety of suitable shapes and sizes and thus, may be a cylindrical, prismatic, coin, or pouch-shape battery and may be a thin film battery or a bulky battery in size. The structure and fabricating method for a lithium ion battery pertaining to the present invention are well known in the art.

Figure 2:
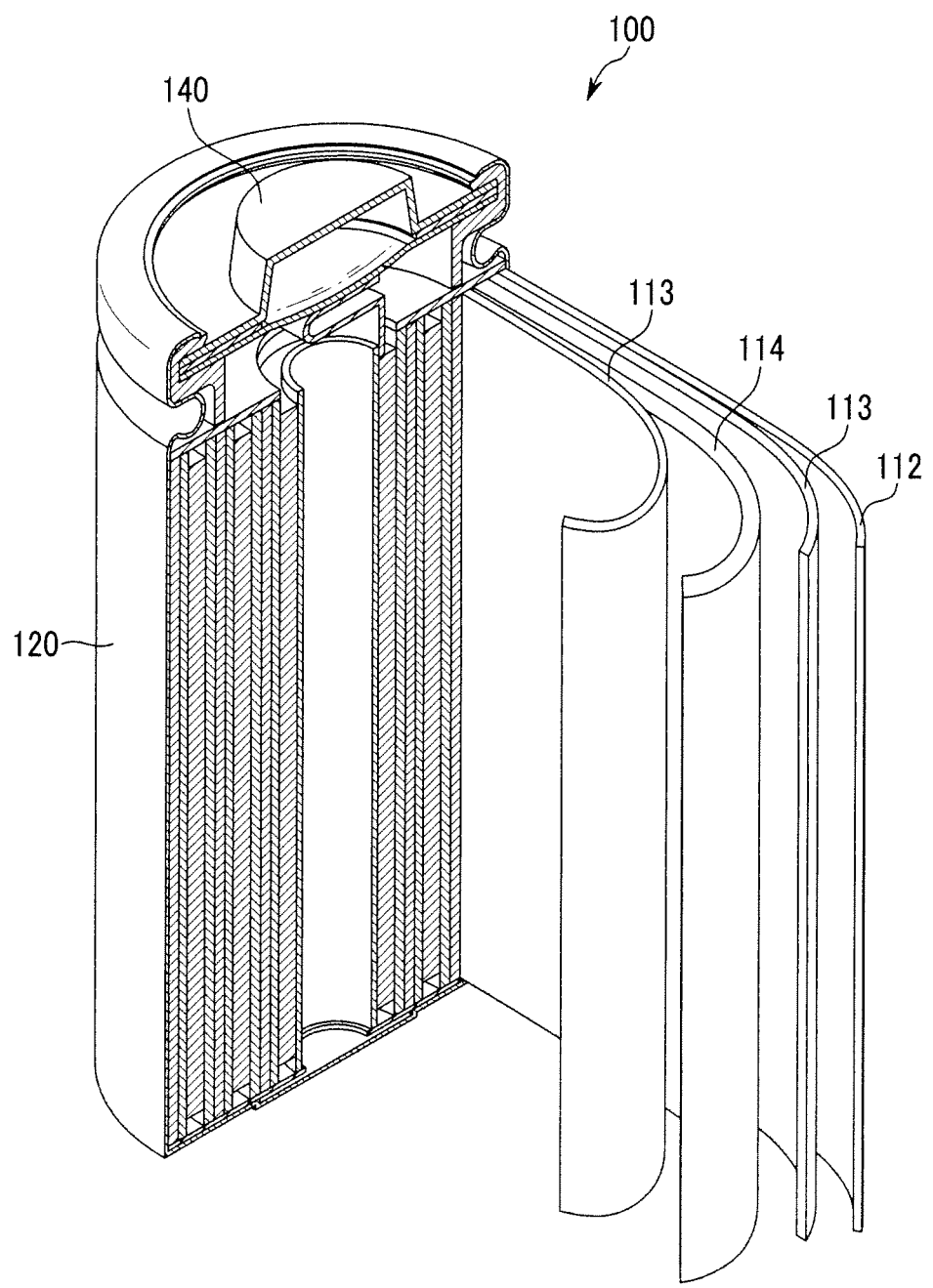
FIG. 2 is a schematic view showing a rechargeable lithium battery according to one embodiment of the present invention.

FIG. 2 is an exploded perspective view showing the schematic structure of a rechargeable lithium battery. Referring to FIG. 2, the rechargeable lithium battery 100 is a cylindrical battery that includes a negative electrode 112, a positive electrode 114, a separator 113 interposed between the negative electrode 112 and the positive electrode 114, an electrolyte impregnating the separator 113, a battery case 120, and a sealing member 140 sealing the battery case 120. The rechargeable lithium battery 100 is fabricated by sequentially laminating the negative electrode 112, the positive electrode 114, and the separator 113, spirally winding them, and housing the spiral-wound product in a battery case 120.

The negative electrode includes a current collector and a negative active material layer formed on the current collector. The negative active material layer may include the silicon-based negative active material described above.

The silicon-based negative active material is the same as described above.

The negative active material may further include a material selected from an alkali metal, an alkaline-earth metal, Group 13 to 16 elements, a transition element, a rare earth element, and combinations thereof (but not Si) as well as the silicon-based negative active material. Specific examples of the material include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The negative active material layer includes a binder and optionally, a conductive material.

The binder improves binding properties of negative active material particles with one another and with a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like but are not limited thereto.

The conductive material improves electrical conductivity of a negative electrode. Any electrically conductive material can be used as a conductive agent, unless it causes a chemical change. Examples of the conductive material include at least one selected from a carbon-based material (such as natural graphite, artificial graphite, carbon black, acetylene black, ketjen black, a carbon fiber, or the like); a metal-based material of a metal powder or a metal fiber (including copper, nickel, aluminum, silver, or the like); a conductive polymer (such as a polyphenylene derivative, or the like); or a mixture thereof.

The current collector includes a copper foil, a nickel foil, a stainless steel foil, a titanium foil, a nickel foam, a copper foam, a polymer substrate coated with a conductive metal, or a combination thereof.

The positive electrode may include a current collector and a positive active material layer formed on the current collector.

The positive active material includes a lithiated intercalation compound that reversibly intercalates and deintercalates lithium ions. The positive active material may include a composite oxide including at least one selected from the group consisting of cobalt, manganese, and nickel, as well as lithium. Specific examples may be the compounds represented by the following chemical formulae:

$Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $LiE_{2-b}R_bO_{4-c}D_c$ ($0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$;

LiQS$_2$; V$_2$O$_5$; LiV$_2$O$_5$; LiTO$_2$; LiNiVO$_4$; Li$_{(3-f)}$J$_2$(PO$_4$)$_3$ (0≤f≤2); Li$_{(3-f)}$Fe$_2$(PO$_4$)$_3$(0≤f≤2); and LiFePO$_4$.

In the above Chemical Formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may be a compound with the coating layer on the surface or a mixture of the active material and a compound with the coating layer thereon. The coating layer may include at least one coating element compound selected from the group consisting of an oxide and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, and a mixture thereof. The coating process may include any suitable processes unless it causes any side effects on the properties of the positive active material (e.g., the coating process may include spray coating, immersing, etc.), which is well known to those who have ordinary skill in this art and will not be described in more detail.

The positive active material layer further includes a binder and a conductive material.

The binder improves binding properties of the positive active material particles to one another and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like but are not limited thereto.

The conductive material improves electrical conductivity of a positive electrode. Any electrically conductive material may be used as a conductive agent unless it causes a chemical change. Examples of the conductive material include at least one selected from natural graphite, artificial graphite, carbon black, acetylene black, ketjen black, a carbon fiber, a metal powder or a metal fiber including copper, nickel, aluminum, silver, and the like. A conductive material such as a polyphenylene derivative and the like may be mixed.

The current collector may be Al but is not limited thereto.

The negative and positive electrodes may be fabricated in a method of preparing an active material composition by mixing the active material, a conductive material, and a binder and coating the composition on a current collector. The electrode manufacturing method is well known and thus, is not described in more detail in the present specification. The solvent includes N-methylpyrrolidone and the like but is not limited thereto.

The electrolyte may include a non-aqueous organic solvent and a lithium salt.

The non-aqueous organic solvent plays a role of transmitting ions taking part in the electrochemical reaction of a battery.

The non-aqueous organic solvent may include a carbonate-based, ester-based, ether-based, ketone-based, alcohol-based, or aprotic solvent but is not limited thereto. The carbonate-based solvent may include dimethylcarbonate (DMC), diethylcarbonate (DEC), dipropylcarbonate (DPC), methylpropylcarbonate (MPC), ethylpropylcarbonate (EPC), ethylmethylcarbonate (EMC), ethylenecarbonate (EC), propylenecarbonate (PC), butylenecarbonate (BC), and/or the like. The ester-based solvent may include methylacetate, ethylacetate, n-propylacetate, dimethylacetate, methylpropinonate, ethylpropinonate, γ-butyrolactone, decanolide, valerolactone, mevalonolactone, caprolactone, and/or the like. The ether-based solvent may include dimethyl ether, dibutyl ether, tetraglyme, diglyme, dimethoxyethane, 2-methyltetrahydrofuran, tetrahydrofuran (THF), and/or the like. The ketone-based solvent may include cyclohexanone, and/or the like. The alcohol-based solvent may include ethanol, isopropylalcohol, and/or the like. The aprotic solvent include nitriles such as R—CN (wherein R is a C2 to C20 linear, branched, or cyclic hydrocarbon, and may include one or more double bonds, one or more aromatic rings, or one or more ether bonds), amides such as dimethylformamide, dimethylacetamide, dioxolanes such as 1,3-dioxolane, sulfolanes, and/or the like.

The non-aqueous organic solvent may be used singularly or in a mixture. When the organic solvent is used in a mixture, its mixture ratio can be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9 as an electrolyte. The electrolyte may have enhanced performance.

In addition, the electrolyte of the present invention may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be represented by the following Chemical Formula 1.

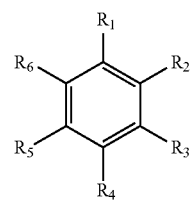

[Chemical Formula 1]

In Chemical Formula 1, R$_1$ to R$_6$ are each independently hydrogen, halogen, a C1 to C10 alkyl group, a C1 to C10 haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3- diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound represented by the following Chemical Formula 2 in order to improve cycle-life of a battery.

[Chemical Formula 2]

$$\underset{R_7 \quad R_8}{\text{structure}}$$

In Chemical Formula 2, $R_7$ and $R_8$ are each independently hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and combinations thereof. The use amount of the vinylene carbonate or the ethylene carbonate-based compound for improving cycle life may be adjusted within an appropriate range.

The lithium salt is dissolved in the non-aqueous solvent and supplies lithium ions in a rechargeable lithium battery, and basically operates the rechargeable lithium battery and improves lithium ion transfer between positive and negative electrodes. The lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), and a combination thereof. The lithium salt may be used in a concentration of about 0.1M to about 2.0M. When the lithium salt is included within the above concentration range, it may improve electrolyte performance and lithium ion mobility due to desired electrolyte conductivity and viscosity.

The separator 113 may include any suitable materials commonly used in the conventional lithium battery for separating (e.g., insulating) a negative electrode 112 from a positive electrode 114 and providing a transporting passage of lithium ion. In other words, it may have a low resistance to ion transport and an excellent impregnation for electrolyte. For example, it may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric. For example, for the lithium ion battery, a polyolefin-based polymer separator such as polyethylene, polypropylene or the like can be used as a major component. In order to ensure the heat resistance or mechanical strength, a coated separator including a ceramic component or a polymer material may also be used. Selectively, it may have a mono-layered or multi-layered structure.

The following examples illustrate the present invention in more detail. These examples, however, should not in any sense be interpreted as limiting the scope of the present invention.

EXAMPLES

Example 1

Preparation of Negative Active Material

In order to coat silicon oxide with $TiO_2$, 10 g of SiO silicon oxide powder was added to 200 mL of ethanol and the mixture was dispersed with an ultrasonic wave. 0.2 mL of ammonium hydroxide and 1 mL of water were then added thereto, and the resulting mixture was agitated. Next, 3.7 mL of titanium isopropoxide was added to the agitated mixture at a speed of 0.02 mL/min. After the addition was complete, the resulting mixture was additionally agitated for 4 hours at 50° C. When the reaction was complete, the reactant was washed with excess amount of distilled water and dried.

The dried powder was heat-treated under an inactive atmosphere (e.g., an inert atmosphere) at 600° C. for 1 hour.

The coated powder was added to 500 mL of a 2% fluoric acid aqueous solution, and the mixture was agitated for 30 minutes. The agitated reactant was washed with a large amount of distilled water using an aspirator, dried, and stored, thereby preparing a silicon-based negative active material.

Comparative Example 1

10 g of SiO silicon oxide powder was added to 500 mL of a 2% fluoric acid aqueous solution, and the mixture was agitated for 30 minutes. When the agitation was complete, the reactant was washed with excess amount of distilled water, dried, and stored.

Then, in order to coat the etched silicon oxide with $TiO_2$, 10 g of $SiO_2$ was added to 200 mL of ethanol, and the mixture was dispersed with an ultrasonic wave. 0.2 mL of ammonium hydroxide and 1 mL of water were added thereto, and the mixture was agitated. Next, 3.7 mL of titanium isopropoxide was added to the agitated mixture at a speed of 0.02 mL/min. After the addition, the reactant was additionally agitated for 4 hours at 50° C. When the reaction was complete, the agitated reactant was washed with a large amount of distilled water using an aspirator and dried.

The dried powder was heat-treated under an inactive atmosphere at 600° C. for 1 hour.

Each negative active material according to Example 1 and Comparative Example 1 were measured about surface area. The results are provided in Table 1. The following Table 1 shows the surface areas of the initial SiO silicon oxide powders before used in Example 1 and Comparative Example 1, the surface area of the negative active material coated with $TiO_2$ before the etching in Example 1, and the surface area of silicon oxide etched before coated with $TiO_2$ in Comparative Example 1.

TABLE 1

| | Surface area | | | | |
|---|---|---|---|---|---|
| | Initial SiO silicon oxide powder | Silicon oxide after etching and before coating in Comparative Example 1 | Negative active material of Comparative Example 1 | Negative active material after coating and before etching in Example 1 | Negative active material of Example 1 |
| BET ($m^2$/g) | 1.68 | 28.26 | 32.14 | 9.6 | 21.08 |

When an initial SiO silicon oxide powder is only etched, it has an increased surface area of 28.26 m²/g, whereas when the initial SiO silicon oxide powder is only coated (and not yet etched), it has an increased surface area of 9.6 m²/g. Accordingly, the etching remarkably increased the surface area of the SiO silicon oxide powder. When an initial SiO silicon oxide powder is coated with $TiO_2$ and then, etched according to Example 1, it has a decreased surface area of 21.08 m²/g, while when the initial SiO silicon oxide powder is etched and then, coated with $TiO_2$ according to Comparative Example 1, it has an increased surface area of 32.14 m²/g.

Experimental Example 1

Cycle-life Characteristic

Each negative active material according to Example 1 and Comparative Example 1 was respectively used to fabricate a 18650 cylindrical battery cell. Herein, an electrode was fabricated using Super-P as a conductive material, PI (a polyimide) as a binder, and NMP (N-METHYL-2-PYRROLIDONE) as a solvent and mixing an active material:the conductive material:the binder in a weight ratio of 80:10:10. A rechargeable lithium battery cell having the structure shown in FIG. 2, was fabricated by using $LiCoO_2$ as a positive electrode, inserting a separator between the electrodes, spirally-winding the resulting product, inserting the spirally-wound product, injecting an electrolyte solution therein, and sealing it. The electrolyte solution was prepared by mixing EC (ethylenecarbonate)/EMC (ethylmethylcarbonate)/DMC (dimethylcarbonate) in a ratio of 3/3/4, dissolving 1M $LiPF_6$ therein and adding a FEC (fluorinated ethyl carbonate) additive thereto. At this time, the amount of FEC was 5 vol % based on 100 volume % of total volume of EC, EMC and DMC.

Figure 3:
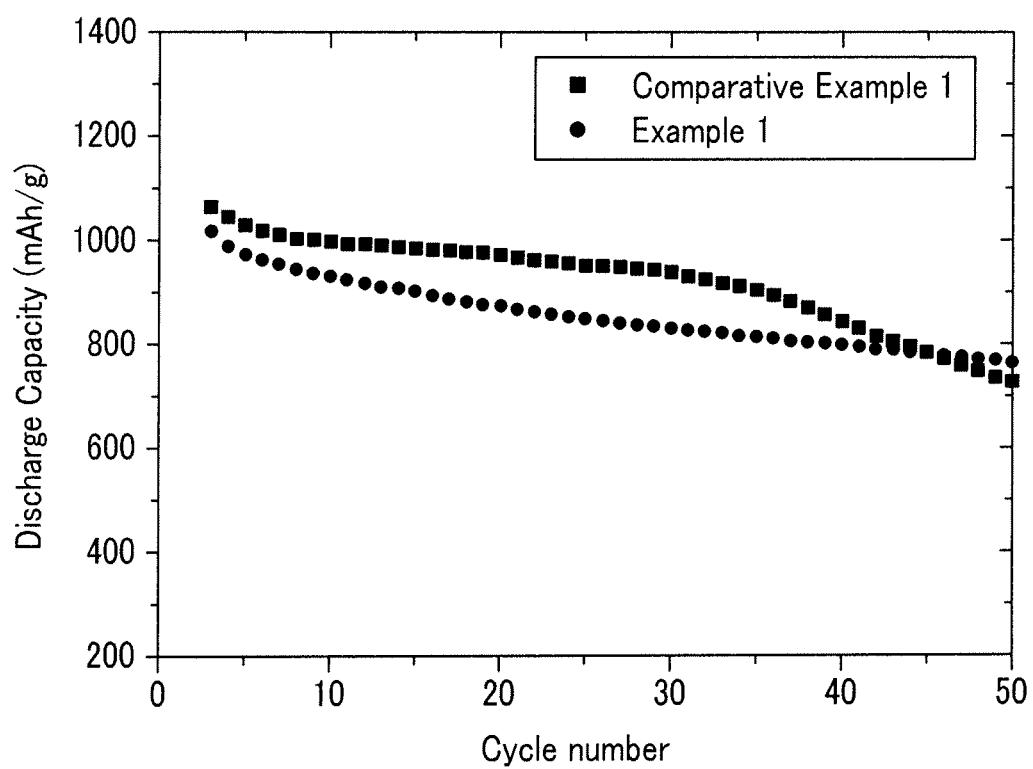
FIG. 3 is a graph showing cycle-life characteristics of rechargeable lithium battery cells fabricated using the negative active materials according to Example 1 and Comparative Example 1.

The rechargeable lithium battery cell was measured regarding cycle-life characteristics. FIG. 3 is a graph showing cycle-life characteristics of the rechargeable lithium battery cells fabricated using the negative active materials according to Example 1 and Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A silicon-based negative active material, comprising:
a core comprising silicon oxide represented by $SiO_x$ (0<x<2); and
a coating layer comprising metal oxide,
wherein:
the metal of the metal oxide comprises at least one selected from aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), and molybdenum (Mo),
the core has a concentration gradient where an atom % concentration of a silicon (Si) element decreases according to increase of a depth from a surface contacting the coating layer to the center of the core, and an atom % concentration of an oxygen (O) element increases according to increase of the depth from the surface contacting the coating layer to the center of the core, and the depth from the surface contacting the coating layer where a concentration of the silicon (Si) element is about 55 atom % corresponds to about 2% to about 20% of a diameter of the core.

2. The silicon-based negative active material of claim 1, wherein in the coating layer, in an integration of an atom % concentration of the silicon (Si) element according to the depth from the surface contacting the coating layer to the center of the core, an integral value of the atom % concentration of the silicon (Si) element from the depth of 0 to the depth where the concentration of the silicon (Si) element is about 55 atom % is in a range from about 5000 nm atom % to about 40000 nm atom %.

3. The silicon-based negative active material of claim 1, wherein the depth from the surface contacting the coating layer where the concentration of the silicon (Si) element is about 55 atom % corresponds to about 100 nm to about 1000 nm.

4. The silicon-based negative active material of claim 1, wherein the core comprises crystalline silicon (Si) and non-crystalline silicon oxide.

5. The silicon-based negative active material of claim 4, wherein an amount of Si is about 50 wt % to about 70 wt % based on 100 wt % of the core, and the amount of Si includes both the amount of Si in the crystalline Si and the amount of Si in the non-crystalline silicon oxide.

6. The silicon-based negative active material of claim 4, wherein a concentration of the crystalline silicon (Si) increases toward the surface contacting the coating layer.

7. The silicon-based negative active material of claim 1, wherein the core comprises $SiO_x$, and wherein 0.5<x<1.5 and x indicates a content ratio of the silicon (Si) element to the oxygen (O) element.

8. The silicon-based negative active material of claim 1, wherein the core has an average particle diameter of about 0.1 μm to about 100 μm.

9. The silicon-based negative active material of claim 1, wherein the silicon-based negative active material has a specific surface area of about 10 m²/g to about 500 m²/g.

10. The silicon-based negative active material of claim 1, wherein a pore is included in at least one part of the surface of contact between the core and coating layer.

11. The silicon-based negative active material of claim 1, wherein the coating layer has a thickness of about 5 nm to about 100 nm.

12. The silicon-based negative active material of claim 1, wherein a weight ratio of the core to the coating layer is in a range from about 99.9:0.1 to about 95:5.

13. The silicon-based negative active material of claim 1, wherein the metal oxide is Ti oxide, and the Ti oxide is $TiO_2$, $TiO_x$ (0<x<2), or a combination thereof.

14. The silicon-based negative active material of claim 1, wherein the silicon-based negative active material further comprises an outermost coating layer comprising a carbon-based material.

15. A rechargeable lithium battery, comprising:
a negative electrode comprising the silicon-based negative active material according to claim 1;
a positive electrode comprising a positive active material for intercalating and deintercalating lithium; and
a non-aqueous electrolyte.

16. The rechargeable lithium battery of claim 15, wherein in the coating layer, in an integration of an atom % concentration of the silicon (Si) element according to the depth from the surface contacting the coating layer to the center of the core, an integral value of the atom % concentration of the silicon (Si) element from the depth of 0 to the depth where the concentration of the silicon (Si) element is about 55 atom % is in a range from about 5000 nm atom % to about 40000 nm atom %.

17. The rechargeable lithium battery of claim 15, wherein the depth from the surface contacting the coating layer where the concentration of the silicon (Si) element is about 55 atom % corresponds to about 100 nm to about 1000 nm.

* * * * *